J. F. APPLEBY, 3 Sheets—Sheet 1.

Assignor, by mesne assignments, of two-thirds to E. D. BISHOP and D. H. PARKER; said PARKER assignor to C. H. PARKER and G. STONE.

GRAIN BINDER.

No. 9,980. Reissued Dec. 20, 1881.

WITNESSES

Edward M. Gallaher.

J. C. Day

INVENTOR

John F. Appleby,

By J. S. Brown, his ATTORNEY.

N. PETERS, Photo-Lithographer, Washington, D. C.

J. F. APPLEBY, 3 Sheets—Sheet 2.
Assignor, by mesne assignments, of two-thirds to E. D. BISHOP and D. H. PARKER; said PARKER assignor to C. H. PARKER and G. STONE.
GRAIN BINDER.
No. 9,980 Reissued Dec. 20, 1881.
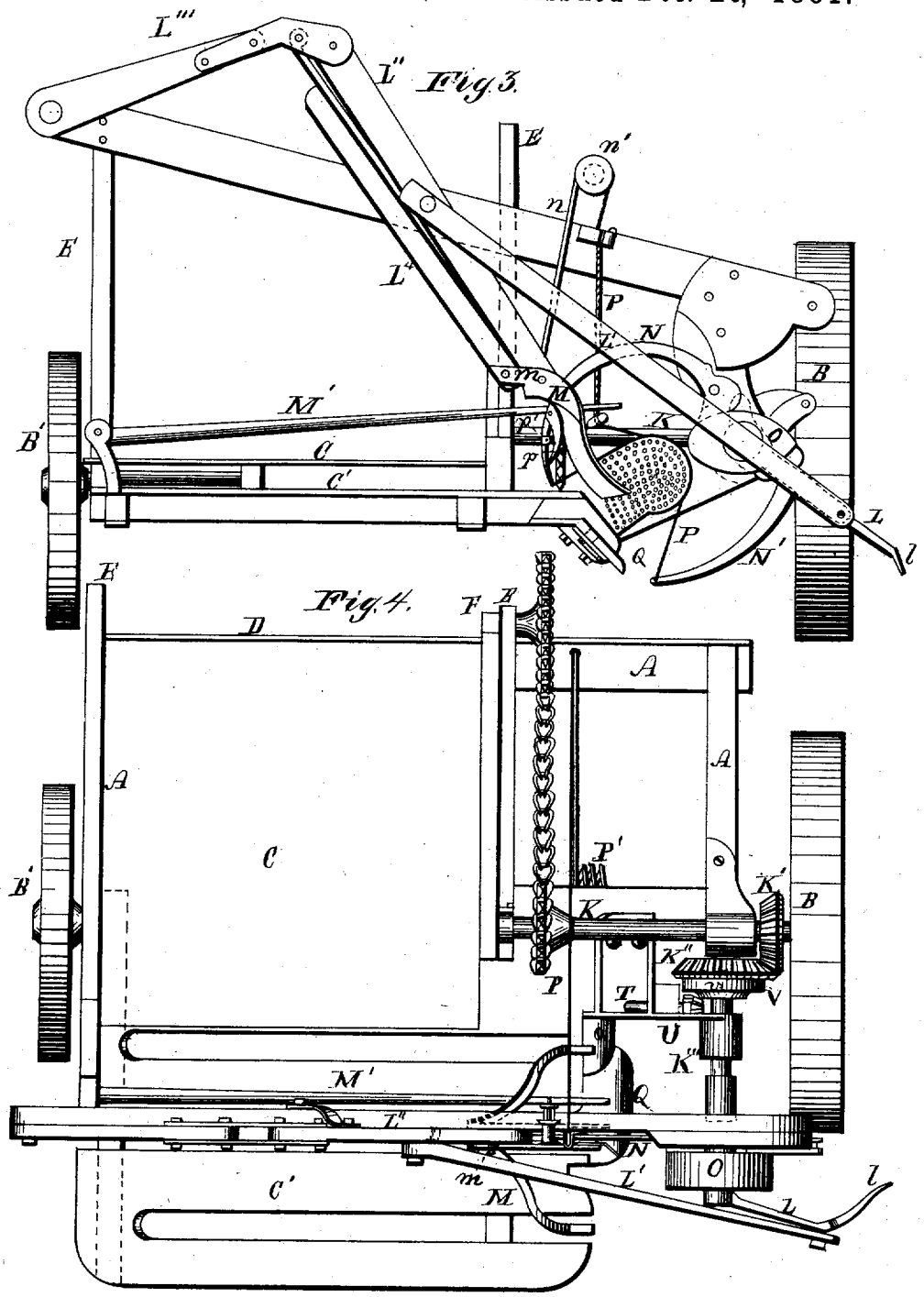
WITNESSES
Fred. G. Dütorich.
Will C. Omohundro.
INVENTOR
John F. Appleby,
By his Attorney, J. S. Brown
N. PETERS, Photo-Lithographer, Washington, D. C.

J. F. APPLEBY, 3 Sheets—Sheet 3.
Assignor, by mesne assignments, of two-thirds to E. D. BISHOP and D. H. PARKER; said PARKER assignor to C. H. PARKER and G. STONE.
GRAIN BINDER.
No. 9,980. Reissued Dec. 20, 1881.
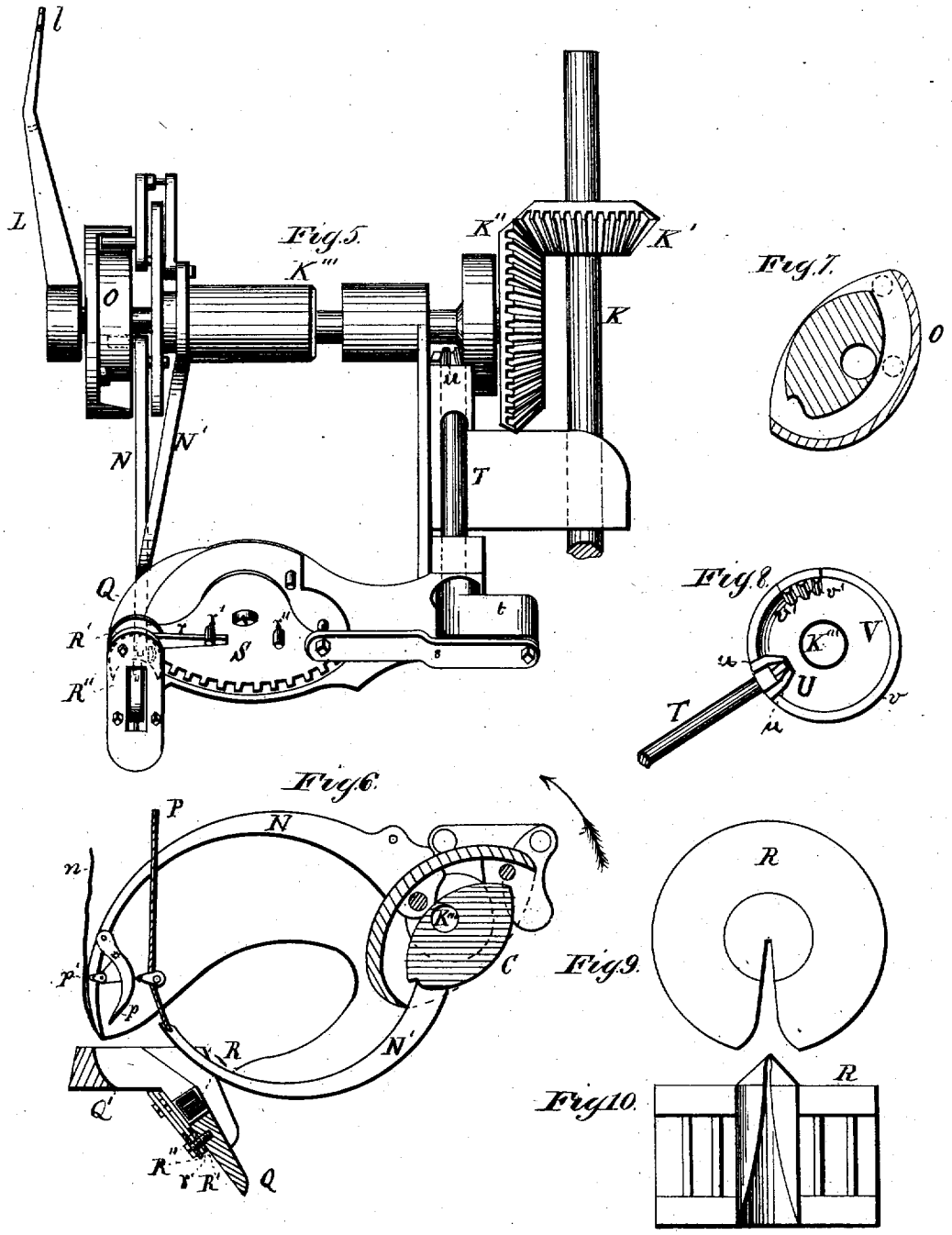
WITNESSES
Fred. G. Dieterich.
Will R. Onohundro.
By his Attorney,
INVENTOR,
John F. Appleby,
J. S. Brown.
N. PETERS, Photo-Lithographer, Washington, D. C.

UNITED STATES PATENT OFFICE.

JOHN F. APPLEBY, OF WEST DEPERE, WIS., ASSIGNOR, BY MESNE ASSIGNMENTS, OF TWO-THIRDS TO EDWIN D. BISHOP, OF MAZOMANIE, AND D. HOLDEN PARKER, OF BELOIT, WIS.; SAID PARKER ASSIGNOR TO CHARLES H. PARKER, OF BELOIT, WIS., AND GUSTAVUS STONE, OF CHICAGO, ILL.

GRAIN-BINDER.

SPECIFICATION forming part of Reissued Letters Patent No. 9,980, dated December 20, 1881.

Original No. 171,465, dated December 28, 1875. Application for reissue filed December 30, 1880.

*To all whom it may concern:*

Be it known that I, JOHN F. APPLEBY, of West Depere, in the county of Brown and State of Wisconsin, have invented certain new and useful Improvements in Self-Raking and Self-Binding Harvesters; and I do hereby declare the following to be a full, clear, and exact description thereof, reference being had to the accompanying drawings, making part of this specification, and to the letters of reference marked thereon.

Figure 1:
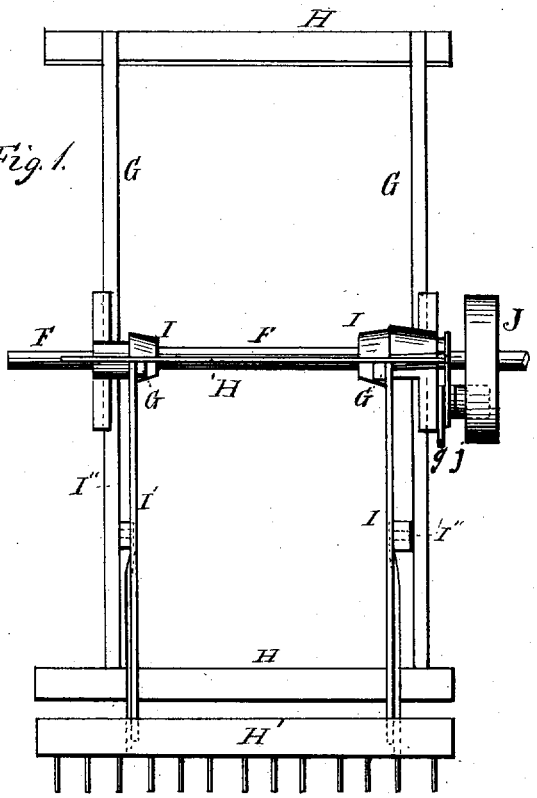
Figure 2:
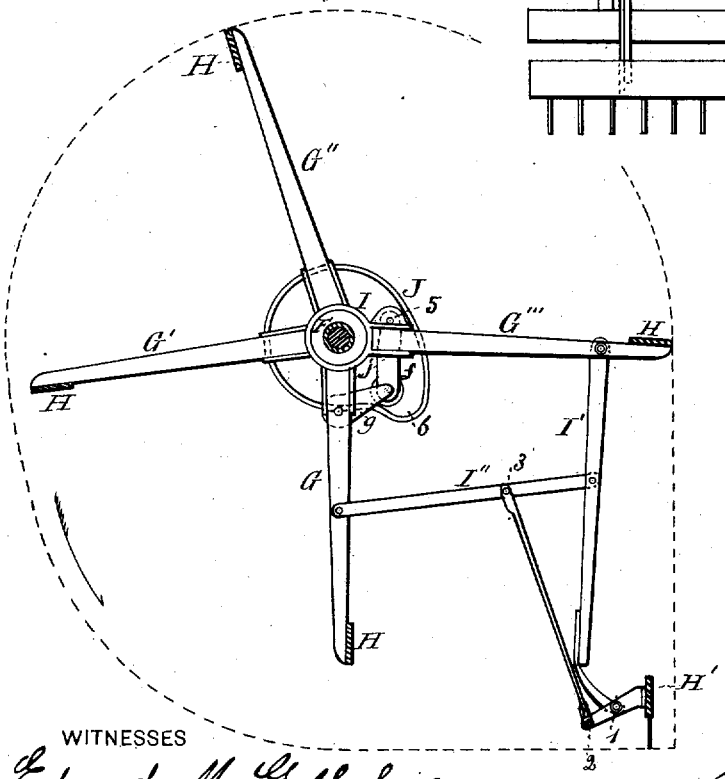

In the said drawings, Figure 1 is a rear elevation of the combined reel and rake device detached from the rest of the machine. Fig. 2 is an end view of the same, or an elevation taken at right angles to the view given at Fig. 1. Fig. 3 is a rear elevation of the harvester with the combined reel and rake removed. Fig. 4 is a top or plan view of the same. Fig. 5 is a bottom view, on an enlarged scale, of the actuating mechanism of the binder. Fig. 6 is a skeleton view, (same scale as Fig. 5,) showing the sheaf-encircling arms, their operating-cams, and the twisting device. Fig. 7 is a detail sectional view (same scale) of the cam seen at Fig. 6, but in a different position. Fig. 8 is a view (same scale) of the intermittent gear and pinion which serve to operate the wire-twisting mechanism. Figs. 9 and 10 are respectively a top and an edge view, on a still larger scale, of the twister-pinion.

In the several figures the same part, whenever visible, will be found designated by the same letter of reference.

The first part of my invention relates to the means employed for sweeping the cut grain backward from the surface of the grain-platform and onto the receiving table or surface of the binder; and it consists in a novel organization, which will be hereinafter more particularly described, and in which a toothed beater-bar of the reel is caused to periodically perform the function of a rake.

The second part of my invention relates to the means for moving the grain along on the binder-table and into the binder-arms to be bound; and it consists in a novel combination of forked sweep or raking device with the binder mechanism and the grain-supporting surface, the said forked raking device operating not only to rake the grain across the said grain-supporting surface, but also to force it into the embrace of the binder-arms.

The third part of my invention relates to the mechanism for binding the collected bunch or gavel of grain into a sheaf; and it consists in a novel organization for the performance of the operations of encircling the gavel with the wire, holding the gavel while being bound, twisting and cutting the wire of the band, and permitting the discharge of the sheaf, all as will be hereinafter more particularly explained and specifically claimed.

A represents the frame-work of the harvester. B is the main driving and ground wheel, and B′ an auxiliary supporting-wheel, while C is the grain-platform, at the forward edge, D, of which may be arranged any suitable cutting mechanism, and over which is supported a novel combined reel and rake by means of the usual reel-standards, E, in which is mounted the reel-shaft F.

The novel means for both reeling the grain to the cutters and onto the platform and for sweeping the cut grain periodically backward on the platform consists of three sets of arms, G, G′, and G″, rigidly attached to the reel-shaft F, arranged radially therewith, and provided, each set, with a beater, H, (all in about the usual manner of constructing reels,) and one set of arms, G‴, provided also with a beater, H, at their outer ends, but mounted at their inner ends in hub-like sleeves I, which turn freely on the shaft F of the reel, and carrying (by means of arms I′) a beater or rake-head, H′, provided with suitable teeth, as shown, which, together with said arms G‴, has a peculiar mode of operation, in the manner and by means of the devices which I will now explain. The bars I′, which at their lower ends have pivotally attached to them, at 1, the rake-head H′, are pivoted at their upper ends to the arms G‴, and from near the middle of each arm I′ to near the middle of each rigidly-attached reel-arm G extends a connecting-rod, I″, pivotally connected at its ends to G and I′, while connecting-rods, pivoted at 2 to the rake-head H′, are hinged at 3 to the bars or rods I″, all as clearly seen at Figs. 2 and 1. J is a fixed cam supported by one of the standards E, and in this cam works an anti-friction roll, which is mounted on a suitable axis at one end of a short arm or piece, *j*, that at its other end is pivoted, as seen at 5, Fig. 2, to a portion of the casting of one of the sleeves I. To that end of the arm *j* which carries the cam-roll is pivoted one end of a connecting piece or link, *g*, which at its other end is pivoted to one of the arms G, as seen best at Fig. 2.

The combined action or operation of the parts just above alluded to may be thus briefly explained, supposing the reel and rake contrivance to be revolving, as indicated by the arrow at Fig. 2, and the head H′ to have just passed the locality at which the beater of arms G′ are seen in said figure: now, as the reel-shaft rotates farther the cam-roller of arm *j* will begin to run into the descending (eccentric) portion of the rim J, the effect of which will be to let the arms G‴ lag back, thus permitting the head H′ to descend below the circular arc in which the ends of the arms rigidly connected to shaft F must travel, and allowing the teeth of said head H′ to come down onto the grain-platform near its front edge. From thence the rake-head is permitted to move along about horizontally, as indicated by the dotted line at Fig. 2, in consequence of the cam-roller following along into the distended portion 6 of the contour of cam J. As this roller begins to travel up the inwardly-sloping part of the cam's face, and to be thereby forced in toward the axis of shaft F, the arms G‴ are thereby forced ahead or toward the arms G″, and by the combined movement of the arms G‴ in this manner and the circular or regular movement of the arms G the relationship of the pivotally-connected arms G, G‴, I′, and I² is so varied, as will be understood by reference to Fig. 2, that the rake-head H′ will, after having completed its horizontal movement, travel about vertically upward until it shall have been turned into about a proper position to perform the office of a revolving beater, in which capacity it will act until it shall have again arrived at the designed point at which it must again assume the movements necessary to perform the raking operation. In moving backward over the platform C the rake sweeps the cut grain endwise of the stalks onto a receiving table or surface, C′, which is arranged immediately in the rear of the grain-platform C and at a slightly lower level than that occupied by the latter.

K is the driving-shaft, which revolves with the traction-wheel, and is fitted with a miter-gear wheel, K′, which meshes into a miter-gear wheel, K″, upon the shaft K‴, to the extreme outer end of which latter shaft is connected a crank, L, which operates a pitman, L′, attached to the fork-handle L″, which is attached to the frame of the harvester by a pivoted connection, L‴.

M is the fork or subsidiary rake, pivoted to the handle L″, and by the short arm *m* pivoted to the pivoted connection L^iv. By the revolution of the crank the fork M is carried back and forth across the subsidiary platform C′ to deliver the grain to the binder. The motion of the pitman is peculiarly adapted to this work, as its speed varies as the crank is turning the dead-centers, gradually slackening as it nears the end of the stroke. By reason of the short arm *m* and connection L^iv the fork is always kept in nearly a vertical position, as will be readily understood. The handle L″ is connected by a pivoted bar, L‴, to the frame of the harvester, so that the motion of the fork is in a right line, and is caused by these various pivotings to move straight across the platform when operated by the pitman, and said fork is moved in such a manner and to such an extent that it not only carries the grain along on the platform toward the binder mechanism, but also performs the function of forcing the grain into the embrace of the binder-arms, as best seen in Fig. 3, thereby rendering unnecessary the presence of any auxiliary device for serving the last-mentioned purpose. The tines of the fork M pass through apertures or slits in the platform upon which it operates, so as to gather more readily all the grain. To one of the tines of the fork is affixed a ring, which encompasses the pole M′, pivoted at the rear of the platform C′, so that the motion of the fork back and forth causes the pole to rise and fall. The purpose of this pole is to compress the grain as it is being gathered into a bundle by the fork and being carried to the binder.

The binding mechanism consists of a cam-operated guide-arm, N, through the nose of which the binding-wire *n* passes from the spool *n′*, upon which it is wound and held by a tension device. The binding-wire, after passing through the nose of the arm N, passes down to a point below the platform, and is secured in a manner to be presently explained, so that the wire stands vertically in the path of the grain as it is pushed from the subsidiary platform. The pressure of the bundle unwinds the wire sufficiently, so that slack enough is made to form a bight, in which the bundle is contained when the arm N comes down, bringing a second bight of the wire with it, so that the bundle is surrounded by a single wire, both ends of which are pressed into a slit in a half-revolving pinion, which twists the two ends and cuts the bundle loose to allow it to fall upon the ground, and at the same time secures the wire at the pinion.

The arm N is operated by the cam O upon the shaft K‴, and is so timed as to descend at the moment the bundle arrives at the place of binding, and to remain down while the pinion twists the wire. A pivoted finger, *p*, upon the arm N serves to press one portion of the wire into the notch of the pinion, while the nose of the arm presses the other—that is to say, the nose and finger take opposite sides of the notched pinion in their descent, straddling it, so as to insure the wire being placed properly in the notch. To prevent the finger *p* from becoming entangled with the grain at the descent of the arm N, it is kept closed upon said arm by a miniature block and tackle, *p'*, operated by the cord P, connected at one end to a spring, P', and at the other to the arm N', which is similar to the arm N and actuated by the same cam, but moves oppositely to the arm N and at a different timing. The cord P yields to the pressure of the gavel fed into the embrace of the arms N N' in the same manner as does the wire *n*, so that as the latter is drawn off from the spool *n'* (to form the loop for the accommodation or reception of the gavel) the cord P in like manner is made to yield in opposition to its spring tension device and form a somewhat similar loop to make room for the gavel, all as best seen by reference to Fig. 3; and when the gavel shall have been bound into a sheaf with the wire and the binder-arms shall have moved to the proper position (and sufficiently opened) to permit the escape from their embrace of the sheaf, cord P then acts, by reason of its tendency to reassume a straight line from the point of its attachment to the end of arm N' to where it passes through the block and tackle, to assist and insure a rapid and positive discharge from the binder of the finished sheaf.

An iron frame-work, Q, contains the notched pinion R. This notched pinion is engaged by a cogged segment, S, fitted with a wrist-pin, to which is attached a connection, *s*, extending to the crank *t* upon the shaft T. Upon the other end of this shaft is a peculiar mitered pinion, U, having six teeth, and made of the form shown at Fig. 8. Two of the teeth upon opposite sides of this pinion are cut partially away to form flanges *u*, one or the other of which flanges, when the pinion is in proper position, rests against the flange *v* of the wheel V, carried upon the shaft K'''. This wheel V has upon its face and within the flange *v* three teeth, *v'*, and flange *v* is cut away at this point. The wheel V is revolved by shaft K''', and brings the teeth *v'* around to the pinion U, causing said pinion to make a half-revolution, and as soon as the teeth are clear the flange *v* of wheel V sets under one of the flanges *u* of the pinion and detains it from further motion until the wheel V brings the teeth round again. This intermittent motion is communicated, through the shaft T, crank *t*, and connection *s*, to the cogged segment S, and the wrist-pin upon this segment is so placed relatively to the axis of motion of said segment and the line passing through the dead-centers of the crank *t* that the operation of the crank *t* upon said segment is to turn it in one direction to one dead-center of the crank and then in the other direction to the other dead-center of the crank upon the shaft T, the wrist-pin upon the segment never passing the dead-center in either direction.

Below the notched pinion R is a plate, R', having a notch to correspond with the notch in the pinion. Below this plate is a pivoted blade, *r*, and below this is a second similar plate, R''. The handle of the blade *r* projects beyond the plates and stands in the path of two pins, *r' r''*, upon the cogged segment, which strike against said handle and move the knife-blade, causing it to shear off the wire to release the bundle after it is bound, as will be readily understood.

The general operation of my improved machine may be thus briefly explained: By the action of the continuously-revolving reel-shaft F the fixed beaters H operate, as usual, to reel the standing grain up to the cutters and the cut grain over onto the platform C, while the peculiarly-moving head H', with its rake-teeth, at one time assists in the usual reeling operation, and at each revolution of the shaft F descends and sweeps the cut grain back over the platform C and onto the table C'. From thence the cut grain is periodically swept in a transverse direction and bundled into the embrace of the binder arms and wire carried by the arm N, and held fast always at the lower end by the holding devices by the action of the forked raking device M, said device, as already explained, operating to perform both the functions of sweeping the grain over the platform C and gathering it into and compressing it within the embrace of the binder-arms. The encircling wire having been twisted and cut, the adjacent ends of the arms separate sufficiently for the escape from them of the sheaf, (while both arms are sufficiently turned down to let the sheaf pass out,) and the spring action of the cord P insures the rapid discharge of the sheaf. The parts then return to their original positions for a repetition of the binding operation.

What I claim as new, and desire to secure by Letters Patent, is—

1. In combination with the reel-shaft F, having one set of its arms, G''', arranged to turn thereon, and coupled to an adjacent pair, G, of the usual (rigidly-attached) arms by means of hinged arms *g* and *j*, provided with a suitable cam-roll, a fixed cam, J, adapted to vary the relation of the arms G''' to the other arms of the reel, and a rake-head, H', connected to the arms G''' and G by a system of pivoted bars, all substantially as and for the purposes set forth.

2. In combination with the receiving table or surface C' and a binder mechanism located at one end thereof, a forked raking device, M, driven from the crank L through the media of arms adapted to give said rake the described movements, and operating, as described, to gather the grain into the binding wire and arms, all substantially as set forth.

3. In combination with the table or grain-support C' and forked raking device M, a compressing-arm, M', the combination being and operating as set forth.

4. In combination with the wire twisting and severing mechanism and the continuously-revolving driving-shaft K‴, (from which said mechanism must derive an intermittent motion,) the intermediate driving mechanism, composed of the rack-wheel V, having the cam-like flange *v*, and the drive-shaft T, provided at one end with the pinion which engages with the rack-wheel and at the other with means for imparting its intermittent rotary movements, all substantially as set forth.

5. In combination with the wire-twisting pinion R and the periodically partially rotative crank-shaft T and pitman *s*, an oscillatory driving-sector, S, the teeth of which engage with those of said pinion, and which is connected to one end of pitman *s*, all as set forth.

JOHN F. APPLEBY.

Witnesses:
JNO. C. MACGREGOR,
J. W. MILLINGTON.